United States Patent [19]

Barham et al.

[11] Patent Number: 4,722,574
[45] Date of Patent: Feb. 2, 1988

[54] PERSONNEL DETECTION AND PROTECTION SYSTEMS FOR USE IN UNDERGROUND MINES

[75] Inventors: Derek K. Barham, Coleorton; Philip P. Jenkins, Ashby-de-la-Zouch, both of England

[73] Assignee: Coal Industry (Patents) Limited, London, England

[21] Appl. No.: 897,377

[22] Filed: Aug. 18, 1986

[30] Foreign Application Priority Data

Sep. 3, 1985 [GB] United Kingdom ............... 8521813

[51] Int. Cl.⁴ .................................... E21D 23/12
[52] U.S. Cl. ................................... 299/1; 299/12; 340/565; 367/93; 405/302
[58] Field of Search ............... 299/1, 12, 30, 33; 180/169; 367/93, 136; 340/541, 565; 405/299, 302

[56] References Cited

U.S. PATENT DOCUMENTS

| | | | |
|---|---|---|---|
| 3,489,460 | 1/1970 | Cooper | 299/1 |
| 3,812,929 | 5/1974 | Farqué | 180/167 |
| 3,891,966 | 6/1975 | Sztankay | 180/169 X |
| 4,016,529 | 4/1977 | Inuzuka et al. | 367/135 X |
| 4,026,654 | 5/1977 | Beaurain | 180/169 X |
| 4,146,271 | 3/1979 | Ward et al. | 299/1 |
| 4,280,580 | 7/1981 | Wojcik | 180/169 |
| 4,453,846 | 6/1984 | Mullins et al. | 299/1 X |
| 4,623,032 | 11/1986 | Kemmer | 180/169 |
| 4,636,774 | 1/1987 | Galvin et al. | 340/565 |

Primary Examiner—Stephen J. Novosad
Assistant Examiner—David J. Bagnell
Attorney, Agent, or Firm—James Creighton Wray

[57] ABSTRACT

A personnel detection and protection system comprises sensor means for detecting the presence of personnel in a prohibited operational zone, and for deriving signal means indicative of such a detected presence, and control means responsive to the deriving of such signal means to control the operation or movement of equipment in the prohibited zone.

7 Claims, 5 Drawing Figures

Notes.
1. Only two aerials ('A') shown per support.
2. Single aerial switching/control unit (located adjacent to support lockout supply unit) servicing multiple aerials.

PERSONNEL DETECTION AND PROTECTION SYSTEMS FOR USE IN UNDERGROUND MINES

This invention relates to personnel detection and protection systems for use in underground mines.

In particular, but not exclusively, the present invention relates to personnel detection and protection systems for use on longwall face installations provided with operational mine equipment comprising a rock or mineral winning machine adapted to traverse the working face, a conveyor for transporting won rock or mineral, and a plurality of advanceable roof supports, the control of at least some of the mine equipment operations being partially or fully automated.

According to the present invention a personnel detection and protection system for use with working in an underground mine comprises sensor means for detecting the presence of personnel in a prohibited operational zone and for deriving signal means indicative of such a detected presence, and control means responsive to the deriving of such signal means to control the operation or movement of equipment in the prohibited zone.

Conveniently, the workings is constituted by a working face and operational mine equipment includes a plurality of advanceable mine roof supports, the sensor means being mounted on at least some of the roof supports.

By way of example embodiments of the present invention will be described with reference to the accompanying drawings, in which:

FIG. 1 shows an advanceable mine roof support installed along a longwall face of an underground.

Figure 1:
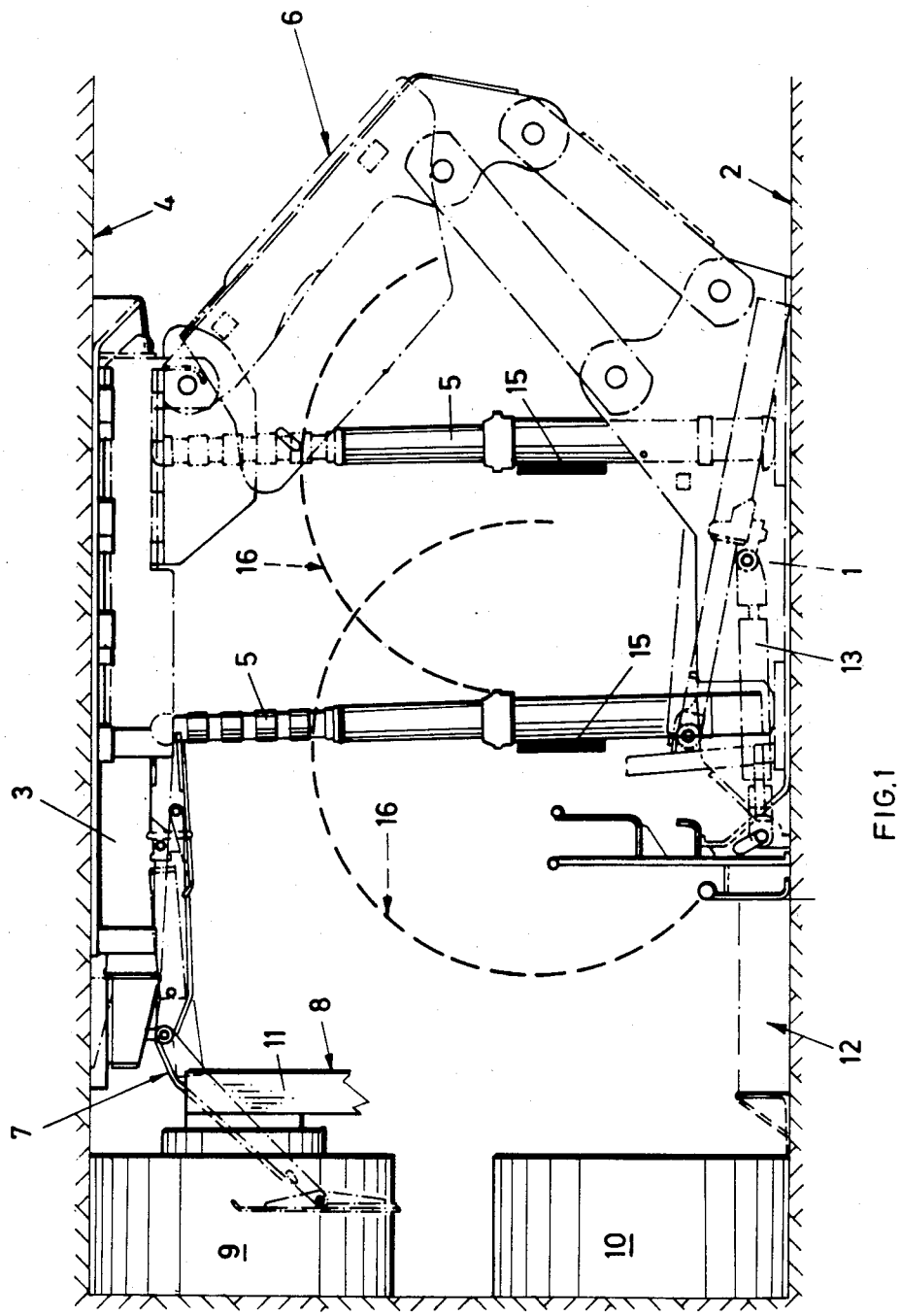
FIG. 1 is an incomplete cross section taken across a longwall face installation in an underground mine.

In practice a plurality of the supports are installed side by side along the longwall face, each support comprising a floor mounted base slidable along the mine floor 2, a mine roof engageable canopy 3 urged towards the mine roof 4 by hydraulic actuated legs 5 extending between the base and the roof canopy. A link arrangement 6 provided on the rear of the supports tends to provide a shield preventing passage of broken rock material from the drawn off goaf region left behind the advancing longwall face.

A pivotally mounted sprag arrangement 7 is mounted on the front of the roof canopy to retain the newly exposed coal face left behind the double ended ranging drum shearer machine 8 as it traverses to and fro along the longwall face. In FIG. 1 only rotary cutter drums 9 and 10 and a portion of one ranging drum carrying arm 11 is shown, the drums winning coal from the working face. FIG. 1 also shows the outline of an armoured longwall face conveyor 12 extending along the length of the longwall face. Rams 13 connect each advanceable roof support to the conveyor.

In operation, as the machine traverses to and fro along the longwall face winning coal to advance the longwall face the conveyor and roof supports are advanced towards the newly exposed coal face, the advance of the operational mine equipment being partially or fully automatically controlled by control means (not shown in FIG. 1) provided in one of two gate roadways (not shown) formed at the ends of the longwall face.

Figure 2:
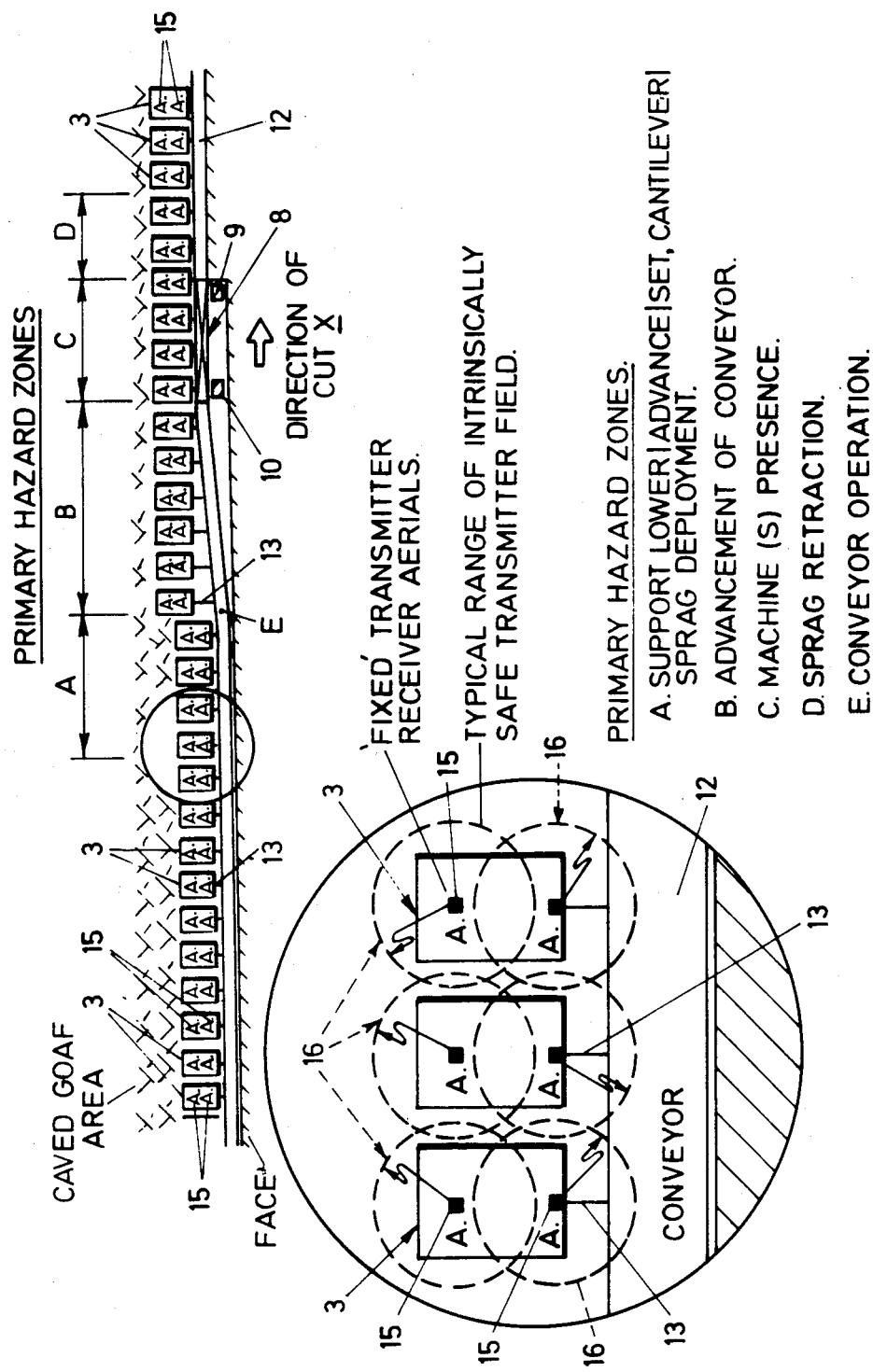
FIG. 2 is a diagrammatic plan of the installation of FIG. 1 and drawn on a reduced scale and including an enlarged scale scrap view of a part of the installation.

FIG. 2 indicates the machine 8 traversing along the face in cutting direction x with the conveyor behind the machine shown advanced up to the newly exposed face. The roof supports associated with the advanced section of the conveyor also are shown advanced. The advancing rams 13 are used to first advance the conveyor and then retracted to advance the associated roof support, during advancement of a roof support, the support is released from its roof supporting mode by retraction of the legs 5.

At least some of the roof supports have sensors 15 mounted on the legs such that each sensor scans a zone the outer limits of which are indicated by the broken lines 16 defining a generally circular profile. The two sensed zones cover the possible paths of personnel travelling along the longwall face and enable the sensors to sense the presence of personnel in prohibited zones during the operation of mine equipment on the working face. The sensor 15 constitutes part of sensor means provided by a personnel detection and protection system provided on the longwall face. FIG. 2 indicates that with the described embodiment all the roof supports on the longwall face are provided with sensors 15. In other embodiments only some of the roof supports are provided with sensors, e.g. every fourth or fifth support along the face.

The sensors may operate on a number of possible personnel detection techniques. They may include sensing of body characteristics e.g. body heat, moisture/fluid content etc. Alternatively, the sensors may provide electronic screening using as for example radar, ultrasound, infra-red, light beam principles etc. As a further alternative the sensor may use an 'active/passive' tagging technique.

With an 'active/passage' tagging techniques each sensor 15 comprises an externally powered, transmitter/receiver aerial fixedly mounted on a roof support leg 5. Each sensor 15 emits a continuous signal the effective range of which is defined by the broken lines in FIG. 1 and 2. With such a technique each individual person carries a transponder 120 (indicated in FIG. 3) ie a miniature radio transmit/receiver device mounted on his person, as for example, on a cap lamp battery. Upon a person entering a prohibited or hazard zone defined by the scanning limits shown in FIGS. 1 and 2 the transponder is activated by the signal received from the associated fixed aerial. The activated transponder emits a signal indicative of the presence of the person within the prohibited or hazardous zone, the emitted signal being received by the associated fixed aerial which conveys a further signal to control means for the mine equipment informing the control means that a person has been detected. The control means responds to the deriving of such signal means to suitably control the operation or movement of the equipment in the prohibited zone, for example, the control means may override the normal control functions and prevent movement of any mine equipment in the prohibited or hazard zone.

In order for the personnel detection and protection system to provide a desired solution to safety each roof support along the face line of roof supports at preselected intervals along the face line is provided with a fixed transmitter/receiver aerial station, each station comprising one or more sensors depending upon the dimensions and constructional design of the associated roof support. FIG. 2 shows every roof support along the face is provided with a sensor station.

The control means upon being informed of the presence of personnel within a prohibited or hazard zone may instigate one of the following operational procedures:

(1) Isolate/immobilise that particular roof support with the detecting aerial;

(2) Isolate/immobilise the roof support as (1) together with a preelected number of adjacent roof supports;

(3) Isolate/immobilise all the roof supports on the face; or (4) Isolate/immobilise all the roof supports and all other mine equipment along the face or along a preselected length of face.

Any roof support isolation/immobilisation which could create secondary operational or hazard problems with the conveyor or with the winning machine wwould require full fail-safe interlocks for consequential isolation/immobilisation.

Figure 3:
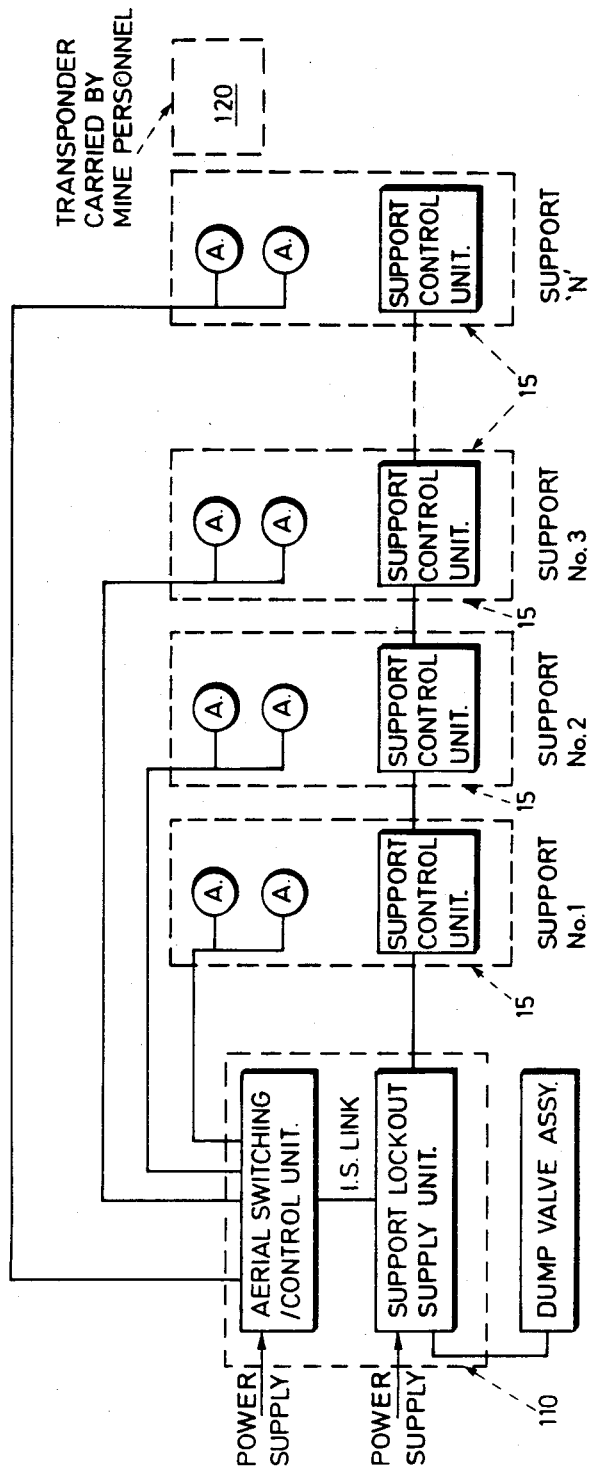
FIG. 3 is a schematic block circuit diagram of a personnel detection and protection system according to the present invention.

A typical 'total immobilisation' installation would require integration of the personnel detection and protection system with the mine equipment own emergency stop system. FIG. 3 illustrates one example of such a control including control means 110.

A possible alternative solution offering a possibly more operationally acceptable but more complex solution comprises individual or 'group' roof support isolation. Each roof support provided with an aerial station (not necessarily all supports) would have its own local electro-hydraulic isolation/immobilization facility. The personnel detection system would integrate locally either into that local roof support or group of adjacent roof supports. Using this approach and with additional systems integration with the winning machine's position along the face control means, the prohibited zone could be arranged to move in unison with the currently active face operations. This would permit clean-up, maintenance operations, etc in those parts of the face not currently involved with mine equipment movement or operation to continue without halting the operation of the mine equipment. Such a machine centred active operation would include not only the area adjacent to the winning machine but also those in front, as for example, roof support sprag retraction and behind the machine, as for example, conveyor push-over advance and roof support sprag deployment etc.

All aspects of the proposed face operations safety system, whether for the primary sensor system or for the secondary integrated control/monitoring systems would require full failure to safety conditions.

Figure 4:
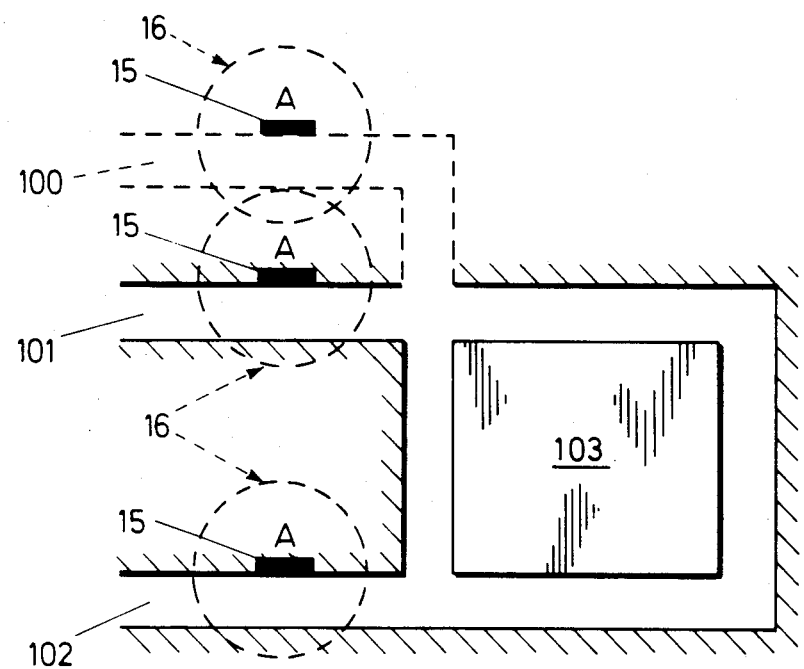
FIG. 4 is a diagrammatic plan of mine workings illustrating a second installation in accordance with the present invention.

FIG. 4 illustrates a second embodiment in accordance with the present invention in which sensors 15 are installed in all mine roadways 100, 101 and 102 leading to mine workings constituting a prohibited or hazardous zone 103, as for example, a bunker, chute, mineral crusher etc. The equipment sensors 15 are arranged to detect the entry of personnel into the zone 103. If the detected mine operator is being transported aong the mine roadway on a belt conveyor or hauled vehicle then the control means would stop the transportation means.

In one form the invention incorporates restricted access control means which permits suitably authorised personnel to temporarily immobilize one of the sensors 15 in order to give access to the prohibited or hazardous zone 103. The restricted access control means would include automatic timer controlled immobilization means mounted outside the range of the fixed transmitter/receiver sensor.

Figure 5:
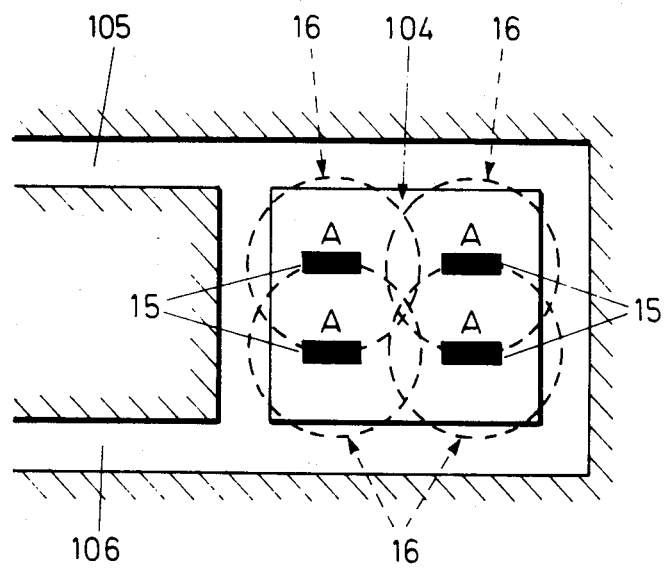
FIG. 5 is a diagrammatic plan of mine workings illustrating a third installation in accordance with the present invention.

FIG. 5 illustrates a third embodiment in accordance with the present invention in which sensors 15 are installed to scan substantially the full area of the prohibited or hazardous zone 104. The two mine roadways 105 and 106 need not be provided with sensors.

We claim:

1. A personnel detection and protection system for use with workings in an underground mine, comprising sensor means for detecting the presence of personnel in a prohibited operational zone and for deriving signal means indicative of such a detected presence, and control means responsive to the deriving of such signal means to control the operation or movement of equipment in the prohibited zone, wherein the working is constituted by a longwall working face and operational mine equipment includes a plurality of mine roof supports advanceable towards the longwall, and wherein the sensor means comprises plural sensors disposed along the longwall.

2. A system as claimed in claim 1, in which a plurality or group of sensors are mounted on each of said at least some of the roof supports 3. A system as claimed in claim 2, in which the sensed zone associated with each sensor or each group of sensors covers all possible paths of personnel travelling along the working face.

4. A system as claimed in claim 3, in which each sensor comprises an externally powered transmitter/receiver aerial.

5. A system as claimed in claim 4, in which each sensor emits a continuous signal.

6. A system as claimed in claim 5, in which the sensor means comprises a transponder sensitive to, and activated by a sensor, a transponder being carried by each mine personnel.

7. A system as claimed in claim 6, in which an activated transponder emits a signal indicative of the presence of a mine operator.

* * * * *